United States Patent
Kobayashi et al.

(10) Patent No.: US 7,373,158 B2
(45) Date of Patent: May 13, 2008

(54) TRANSMISSION OF SHORT MESSAGE WITH A MASTER UNIT

(75) Inventors: Fumiaki Kobayashi, Yamatokoriyama (JP); Yasunori Ishii, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1026 days.

(21) Appl. No.: 10/654,484

(22) Filed: Sep. 4, 2003

(65) Prior Publication Data
US 2004/0049551 A1 Mar. 11, 2004

(30) Foreign Application Priority Data
Sep. 5, 2002 (JP) ............................. 2002-260423

(51) Int. Cl.
  H04Q 7/20 (2006.01)
  H04Q 7/00 (2006.01)
  H04B 7/00 (2006.01)
(52) U.S. Cl. ................ 455/466; 455/412.1; 455/414.1; 379/93.24; 709/206
(58) Field of Classification Search ................ 455/466, 455/557, 412.1; 709/206, 243; 379/93.24
  See application file for complete search history.

(56) References Cited

U.S. PATENT DOCUMENTS

| | | | | |
|---|---|---|---|---|
| 5,920,826 A | * | 7/1999 | Metso et al. ................. | 455/466 |
| 6,141,404 A | * | 10/2000 | Westerlage et al. ......... | 379/118 |
| 6,205,330 B1 | * | 3/2001 | Winbladh .................... | 455/466 |
| 2002/0019243 A1 | * | 2/2002 | Zhang et al. ................ | 455/466 |
| 2002/0077134 A1 | | 6/2002 | Mizell et al. | |
| 2002/0086689 A1 | * | 7/2002 | Moran et al. ................ | 455/466 |
| 2002/0159387 A1 | * | 10/2002 | Allison et al. ............... | 455/466 |

FOREIGN PATENT DOCUMENTS

| | | |
|---|---|---|
| DE | 198 57 902 A1 | 6/2000 |
| DE | 101 14 950 A1 | 1/2002 |
| EP | 1 065 899 A1 | 1/2001 |

* cited by examiner

*Primary Examiner*—Duc M. Nguyen
*Assistant Examiner*—Daniel Lai
(74) *Attorney, Agent, or Firm*—Birch, Stewart, Kolasch & Birch, LLP (57) ABSTRACT

An SMS related table memory portion of a memory device has a storing region for each SMSC apparatus, and the telephone number of the SMSC apparatus, the program of the communication protocol, the parameter and the like are stored in each storing region. When sending a short message, a controlling device selects an SMSC apparatus based on whether a short message is inputted from an input device or sent from a slave unit, refers to the storing region for the selected SMSC apparatus of the SMS related table memory portion, and performs dial calling from a network control device based on the telephone number and the communication protocol of the SMSC apparatus that are stored. After a line is established, short message data that has been prepared in advance are sent to the SMSC apparatus.

8 Claims, 8 Drawing Sheets

| SMSC APPARATUS 100 | | |
|---|---|---|
| TERMINAL : MASTER UNIT 1a | SENDER ID: 987 654 321 | USE DEGREE |
| APPLICATION PROGRAM (PROTOCOL · PARAMETER) | | |
| RECEIVED DATA: (BLOCK 1) | | |
| RECEIVED DATA: (BLOCK 2) | | |
| RECEIVED DATA: (BLOCK 3) | | |
| | | |
| RECEIVED DATA: (BLOCK 10) | | |

| SMSC APPARATUS 200 | | |
|---|---|---|
| TERMINAL : SLAVE UNIT 1c | SENDER ID: 876 543 210 | USE DEGREE |
| APPLICATION PROGRAM (PROTOCOL · PARAMETER) | | |
| RECEIVED DATA: (BLOCK 1) | | |
| RECEIVED DATA: (BLOCK 2) | | |
| RECEIVED DATA: (BLOCK 3) | | |
| | | |
| RECEIVED DATA: (BLOCK 10) | | |

| SMSC APPARATUS 300 | | |
|---|---|---|
| TERMINAL : SLAVE UNIT 1b | SENDER ID: 765 432 109 | USE DEGREE |
| APPLICATION PROGRAM (PROTOCOL · PARAMETER) | | |
| RECEIVED DATA: (BLOCK 1) | | |
| RECEIVED DATA: (BLOCK 2) | | |
| RECEIVED DATA: (BLOCK 3) | | |
| | | |
| RECEIVED DATA: (BLOCK 10) | | |

TRANSMISSION OF SHORT MESSAGE WITH A MASTER UNIT

This Nonprovisional application claims priority under 35 U.S.C. § 119 (a) on Patent Application No(s). 2002-260423 filed in JAPAN on Sep. 5, 2002, the entire contents of which are hereby incorporated by reference.

BACKGROUND OF THE INVENTION

1. Field of the Invention

The present invention relates to a communication terminal connected to a public line network, for sending and receiving short message data to/from another communication terminal via a center apparatus connected to the public line network.

2. Description of the Related Art

In recent years, a short message service system is constructed in which a short message service center (hereinafter, abbreviated as "SMSC") apparatus connected to a public line network via a gateway or the like transmits short messages between communication terminals connected to the public line network by "store-and-forward", which is a form of storage and forwarding of messages, utilizing wired or wireless communications, and a large number of communication terminal users utilize this system. The "short message" refers to character data constituted by not more than a predetermined number of characters such as about several tens of characters.

The short messages can be sent and received by the following two steps: the first step of storing (accumulating) short messages and the second step of forwarding (transferring) the short messages.

In the storing step, a short message is sent from a sending communication terminal to an SMSC apparatus, and the SMSC apparatus stores the received short message. In the forwarding step, the SMSC apparatus sends the received short message to a receiving communication terminal.

In the storing step, the sending communication terminal dials the telephone number of the SMSC apparatus on a public line network in order to establish connection to the SMSC apparatus to send a short message to the SMSC apparatus. The switchboard of the public line network sends the ID (i.e., the telephone number) of the sender of the sending communication terminal in accordance with the incoming call signal (ringer). The SMSC apparatus uses the sender ID to identify the sending communication terminal and also uses the sender ID to charge the service fees after the identification. When a link of the communication line is established between the sending communication terminal and the SMSC apparatus, the phase of short message transfer between the sending communication terminal and the SMSC apparatus is started. When the transfer of the short message from the sending communication terminal ends, the line is opened. The SMSC apparatus stores the short message received from the sending communication terminal in storing means.

In the forwarding step, the SMSC apparatus dials the telephone number of a receiving communication terminal on the public line network in order to establish connection to the receiving communication terminal to send the stored short message to the SMS compatible receiving communication terminal. The ID (telephone number) of the receiving communication terminal is contained in the short message in advance. The switchboard of the public line network sends the sender ID of the SMSC apparatus to the receiving communication terminal in accordance with the incoming call signal. The receiving communication terminal uses the sender ID of the SMSC apparatus to identify the sending device. When the results of the identification confirmed that the incoming call is from the SMSC apparatus, the receiving communication terminal is switched automatically to the mode of receiving a short message and establishes a communication line with the SMSC apparatus, and when the line is established, the short message is transferred from the SMSC apparatus. When the transfer ends, the line is opened.

The short message transmission service (SMS) is performed by the above-described steps, and a large number of communication terminal users contract with an SMS provider for subscription and thus gain benefits.

Conventionally, a communication terminal user generally contracts with only one short message service provider, and therefore the short message service-compatible communication terminal sends and receives short messages only via the SMSC apparatus of the provider with whom the user contracted. Therefore, the user cannot use an SMSC apparatus other than that of the provider with whom the user contracted. Consequently, short messages cannot be sent and received to/from a user that uses a short message transmission service provided by the other providers. Furthermore, the billing terms of charges or the service available time zone depend on the provider, but the user cannot use other SMSC apparatuses than that of the provider with whom the user contracted. Therefore, there is no degree of freedom in the use conditions, and the convenience and the cost are problematic.

Furthermore, in order that a plurality of users use different services via different SMSC apparatuses, a communication terminal is required for each user and each SMSC apparatus that is utilized, which increases the set-up area and the set-up cost.

SUMMARY OF THE INVENTION

It is an object of the invention to provide a communication terminal having improved convenience when a user uses a short message service and capable of reducing costs when used even by a plurality of users.

The invention provides a communication terminal that is connected to a public line network, for communicating with a center apparatus connected to the public line network to send and receive short message data to/from another communication terminal via the center apparatus, the communication terminal comprising:

a master unit; and a slave unit for wireless communications with the master unit, the slave unit including:

slave unit side input means for inputting short message data, and slave unit side wireless communicating means for sending the short message data inputted with the slave unit side input means and for receiving short message data from the master unit, the master unit including:

master unit side input means for inputting short message data, and master unit side communicating means that is connected to a public line network, for sending and receiving short message data to/from the center apparatus, master unit side wireless communicating means for sending short message data received by the communicating means and receiving short message data from the slave unit, storing means for storing a plurality types of communication protocol, each of which corresponds to a center apparatus, to be used for communications of the communication means, selecting means for selecting a center apparatus to be communicated with among the center apparatuses whose communication protocol information is stored, based on a predetermined condition, and controlling means for controlling the communicating means so as to send short message data inputted with the master unit side input means or short message data received by the master unit side wireless communicating means to the center apparatus when sending the short message data, and to receive short message data from the center apparatus when receiving the short message data, based on the communication protocol information of the center apparatus selected by the selecting means, and for determining whether or not the short message data received from the center apparatus is addressed to the slave unit, and when the short message data is determined as being addressed to the slave unit, controlling the master unit side wireless communicating means so as to send the received short message data to the slave unit.

According to the invention, the communication terminal can send and receive short message data to/from other communication terminals via the center apparatus by being connected to a public line network and performing communications with the center apparatus connected to the public line network. The communication terminal includes a master unit and a slave unit that perform wireless communications with each other.

When the user operates the slave unit to send short message data, first, short message data is inputted with the slave unit side input means. The short message data inputted with the slave unit side input means are sent to the master unit by the slave unit side wireless communicating means.

When the master unit side wireless communicating means receives the short message data sent from the slave unit, the selecting means selects a center apparatus to be communicated with among the center apparatuses whose communication protocol information is stored, based on a predetermined condition. When a center apparatus is selected, the controlling means controls the communicating means so as to send the short message data received by the master unit side wireless communicating means to the center apparatus, based on the communication protocol information of the center apparatus selected by the selecting means.

Thus, the user can send the inputted short message data to the center apparatus by operating the slave unit.

When the communicating means of the master unit receives short message data from the center apparatus, the controlling means determines whether or not the short message data received from the center apparatus is addressed to the slave unit. When the short message data is addressed to the slave unit, the controlling means controls the master unit side wireless communicating means so as to send the received short message data to the slave unit.

Thus, the user can receive the short message data addressed to the slave unit with the slave unit.

In the case where the user operates the master unit to send short message data, when the short message data is inputted with the master unit side input means, the selecting means selects a center apparatus to be communicated with among the center apparatuses whose communication protocol information is stored, based on a predetermined condition. When a center apparatus is selected, the controlling means controls the communicating means so as to send the short message data inputted with the master unit side input means to the center apparatus, based on the communication protocol information of the center apparatus selected by the selecting means.

The user can send and receive the short message data by operating the slave unit and the master unit in the above-described manner, so that the convenience can be improved when the user uses a short message service, and even if a plurality of users use a short message service, it is not necessary to set up communication terminals separately, which reduces the set-up cost.

Furthermore, in the invention, it is preferable that the storing means stores association between each center apparatus whose communication protocol information is stored and the master unit or the slave unit, and when the master unit side wireless communicating means has received short message data inputted with the slave unit side input means, the selecting means selects a center apparatus associated with the slave unit from which the short message data is sent; and when the short message data is inputted with the master unit side input means, the selecting means selects a center apparatus associated with the master unit.

According to the invention, the storing means stores association between each center apparatus whose communication protocol information is stored and the master unit or the slave unit, and when the master unit side wireless communicating means has received short message data inputted with the slave unit side input means, the selecting means selects a center apparatus associated with the slave unit from which the short message data is sent, and when the short message data is inputted with the master unit side input means, the selecting means selects a center apparatus associated with the master unit.

Thus, the center apparatus to which the short message data is to be sent can be selected simply by switching the device to be operated. Therefore, the user does not have to select the center apparatus, which improves the convenience.

Furthermore, in the invention, it is preferable that when the communicating means receives short message data from a center apparatus, the controlling means refers to the storing means and determines whether or not the center apparatus that sent the short message data is a center apparatus associated with the slave unit, so as to determine whether or not the received short message data is addressed to the slave unit.

According to the invention, when the communicating means receives short message data from a center apparatus, the controlling means refers to the storing means and determines whether or not the center apparatus that sent the short message data is a center apparatus associated with the slave unit, so as to determine whether or not the received short message data is addressed to the slave unit.

Thus, it is easily determined whether or not the short message data received from the center apparatus is addressed to the slave unit.

Furthermore, in the invention, it is preferable that the master unit includes counting means for counting the degree of communications indicating the communication amount with a center apparatus for each center apparatus whose communication protocol information is stored, and for storing the counted communication amount in the storing means for each center apparatus.

According to the invention, the counting means counts the degree of communications indicating the communication amount with a center apparatus for each center apparatus whose communication protocol information is stored, and stores the counted communication amount in the storing means for each center apparatus.

Thus, the fee incurred for the use of the center apparatus can be calculated for each center apparatus. For example, in the case where a center apparatus to be used is fixed for each user or each department, communication fees that are charged for each user or each department can be calculated easily.

Furthermore, in the invention, it is preferable that the master unit includes printing means for printing short message data, and at least one of the master unit and the slave unit includes designating means for designating short message data to be printed by the printing means from among received short message data addressed to the slave unit.

According to the invention, the master unit includes printing means for printing short message data. To print short message data with the printing means, when the user operates the designating means, short message data among the received short message data addressed to the slave unit is printed.

Thus, even if the slave unit does not include printing means, the short message data addressed to the slave unit can be printed by printing means included in the master unit, which improves the convenience.

Furthermore, in the invention, it is preferable that the master unit includes master unit side displaying means for displaying short message data, the slave unit includes slave unit side displaying means for displaying short message data, and the slave unit side displaying means has higher resolution than that of the master unit side displaying means.

According to the invention, each of the master unit and the slave unit includes displaying means for displaying short message data, and the slave unit side displaying means has a higher resolution than that of the master unit side displaying means.

Furthermore, in the invention, it is preferable that the master unit includes converting means for converting a character code into a character font, the master unit side wireless communicating means sends a character font converted from a character code contained in received short message data to the slave unit as image data; the slave unit side wireless communicating means receives the image data sent from the master unit; and the slave unit side displaying means displays the image data received by the slave unit side wireless communicating means in place of the short message data.

According to the invention, the master unit includes converting means for converting a character code into a character font, and a character code contained in received short message data is converted into a character font. The master unit side wireless communicating means sends the converted character font to the slave unit as image data. When the slave unit side wireless communicating means receives the image data sent from the master unit, the slave unit side displaying means displays the received image data in place of the short message data.

Thus, short message data that is difficult to be displayed by the master unit side displaying means whose display function is conventionally limited, for example, short message data including accent marks of German or French and special characters can be displayed by the slave unit side displaying means.

Furthermore, the invention provides a communication terminal that is connected to a public line network, for sending and receiving short message data to/from a center apparatus connected to the public line network to send and receive the short message data to/from another communication terminal via the center apparatus, the communication terminal comprising:
a master unit; and
a slave unit for wireless communications with the master unit,
the slave unit including:
input means for inputting short message data to be sent to the center apparatus, and
output means for outputting short message data received from the center apparatus.

According to the invention, a communication terminal that is connected to a public line network sends and receives short message data from/to a center apparatus connected to the public line network so as to send and receive the short message data to/from another communication terminal via the center apparatus. The communication terminal includes a master unit and a slave unit, which perform wireless communications with each other. The short message data inputted from the input means of the slave unit by the user are sent to the center apparatus, and the short message data received from the center apparatus are output from the outputting means.

Thus, the user can send and receive short message data by operating the slave unit connected wirelessly to the master unit, so that short message data can be sent and received at an arbitrarily selected place in the communication zone between the master unit and the slave unit, which improves the convenience.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

The invention is not limited thereby.

Figure 1:
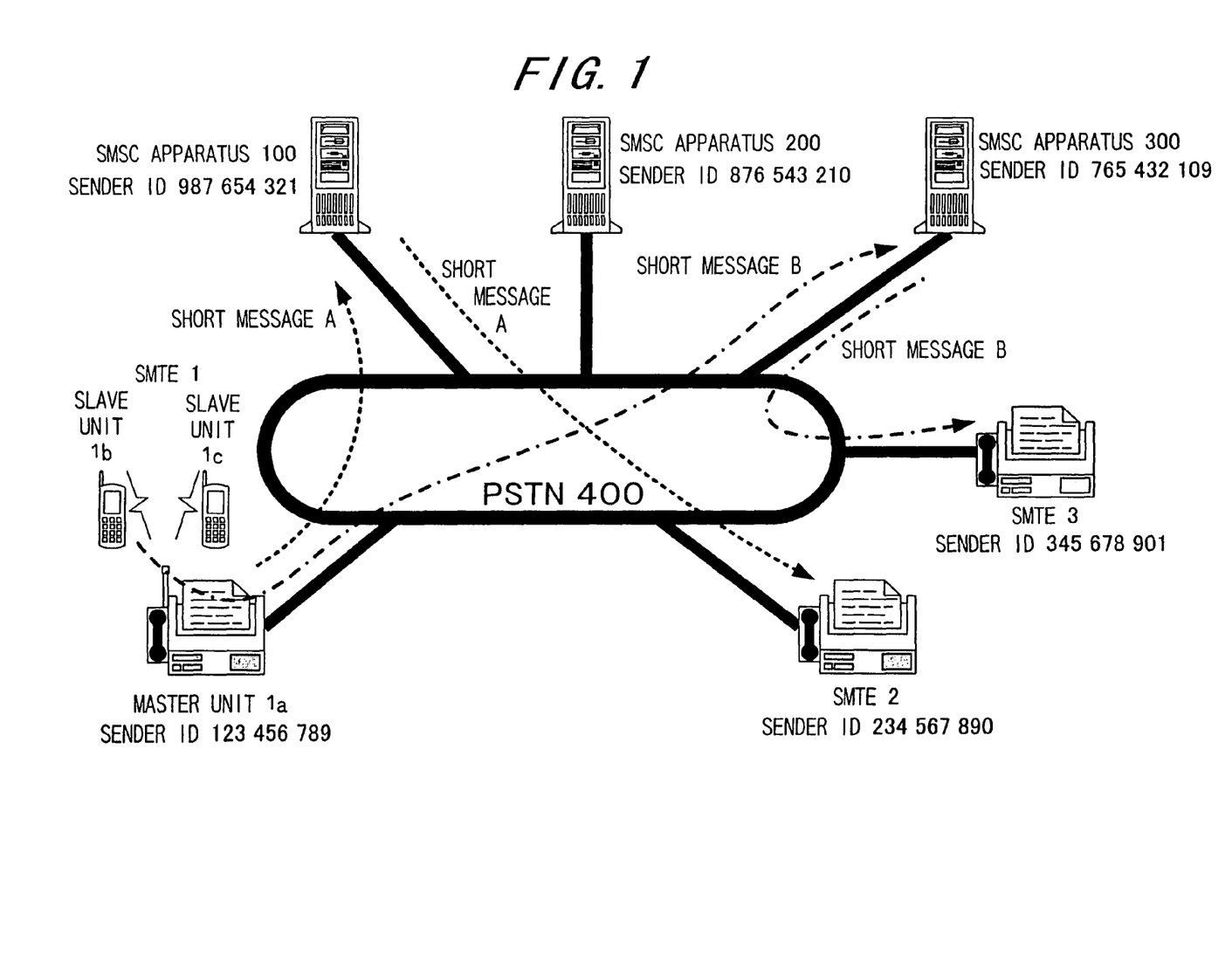
FIG. 1 is a schematic view of a transmission system of a short message service.

FIG. 1 is a schematic view of a transmission system of a short message service. Short message service compatible communication terminals (hereinafter, abbreviated as "SMTE") 1, 2, 3 and SMSC apparatuses 100, 200, and 300 are connected to a PSTN (public switchboard telephone network) 400, which constitute a transmission system of a short message service. The invention can apply to various communication terminals connected to the PSTN 400, but herein, a facsimile apparatus is taken as the communication terminal. The SMTE 1 includes a master unit 1a and slave units 1b and 1c, and the master unit 1a can communicate wirelessly with the slave units 1b and 1c. The number of the slave units is not limited to two, and three or more slave units can be used. The master unit 1a can communicate wirelessly with the slave units 1b and 1c by internal extension-to-extension call. The slave units 1b and 1c can communicate by telephone and facsimile with other communication terminals connected to the PSTN 400 via the master unit 1a. Furthermore, the slave units 1b and 1c can communicate with SMSC apparatuses via the master unit 1a for short message data transmission. The manner in which the SMTE 1 that is an embodiment of the invention operate for short message transmission will be described with reference to FIG. 1.

The PSTN 400 is a public line network made of wired media, and the SMSC apparatuses 100, 200, and 300 are connected to the PSTN 400 and constitute a part of the group of SMSC apparatuses that perform a short message transmission service. The SMSC apparatuses 100, 200, and 300 have "987 654 321", "876 543 210", and "765 432 109" as the sender ID (telephone number) on the PSTN, respectively. The SMSC apparatuses 100, 200, and 300 are SMSC apparatuses that perform a short message service provided by different providers from each other.

The SMTEs 1, 2, and 3 constitute a part of the group of SMTEs that connected to the PSTN 400 in order to receive a short message service. The SMTEs 1, 2, and 3 have "123 456 789", "234 567 890", and "345 678 901" as the sender ID (telephone number) on the PSTN 400, respectively. The SMTEs 1, 2, and 3 are used by different users. The SMTE 1 is a communication terminal that is an embodiment of the invention and the SMTEs 2 and 3 are conventional communication terminals. The case where a short message is sent from the SMTE 1 to each of the SMTEs 2 and 3 will be described.

The arrow of a broken line in FIG. 1 shows a communication path of a short message A when the short message A is sent from the SMTE 1 to the SMTE 2. The master unit 1a is configured so as to communicate with the SMSC apparatus 100, so that when the user operates the master unit 1a, the short message A is sent to the SMSC apparatus 100. The SMSC apparatus 100 temporarily stores the short message A received from the SMTE 1. Then, the SMSC apparatus 100 calls the SMTE 2 to which the short message is to be sent, and after the line is established, the short message A is sent out. Thus, the short message A can be sent from the SMTE 1 to the SMTE 2.

The arrow of a chain line in FIG. 1 shows a communication path of a short message B when the short message B is sent from the SMTE 1 to the SMTE 3. The slave unit 1b is configured so as to communicate with the SMSC apparatus 300 via the master unit 1a, so that when the user operates the slave unit 1b, the short message B is sent to the SMSC apparatus 300. The SMSC apparatus 300 temporarily stores the short message B received from the slave unit 1b via the master unit 1a. Then, the SMSC apparatus 300 calls the SMTE 3 to which the short message is to be sent, and after the line is established, the short message B is sent out. Thus, the short message B can be sent from the SMTE 1 to the SMTE 3.

Next, the communication terminals that can transmit short messages in the above-described manner will be described in detail.

Figure 2:
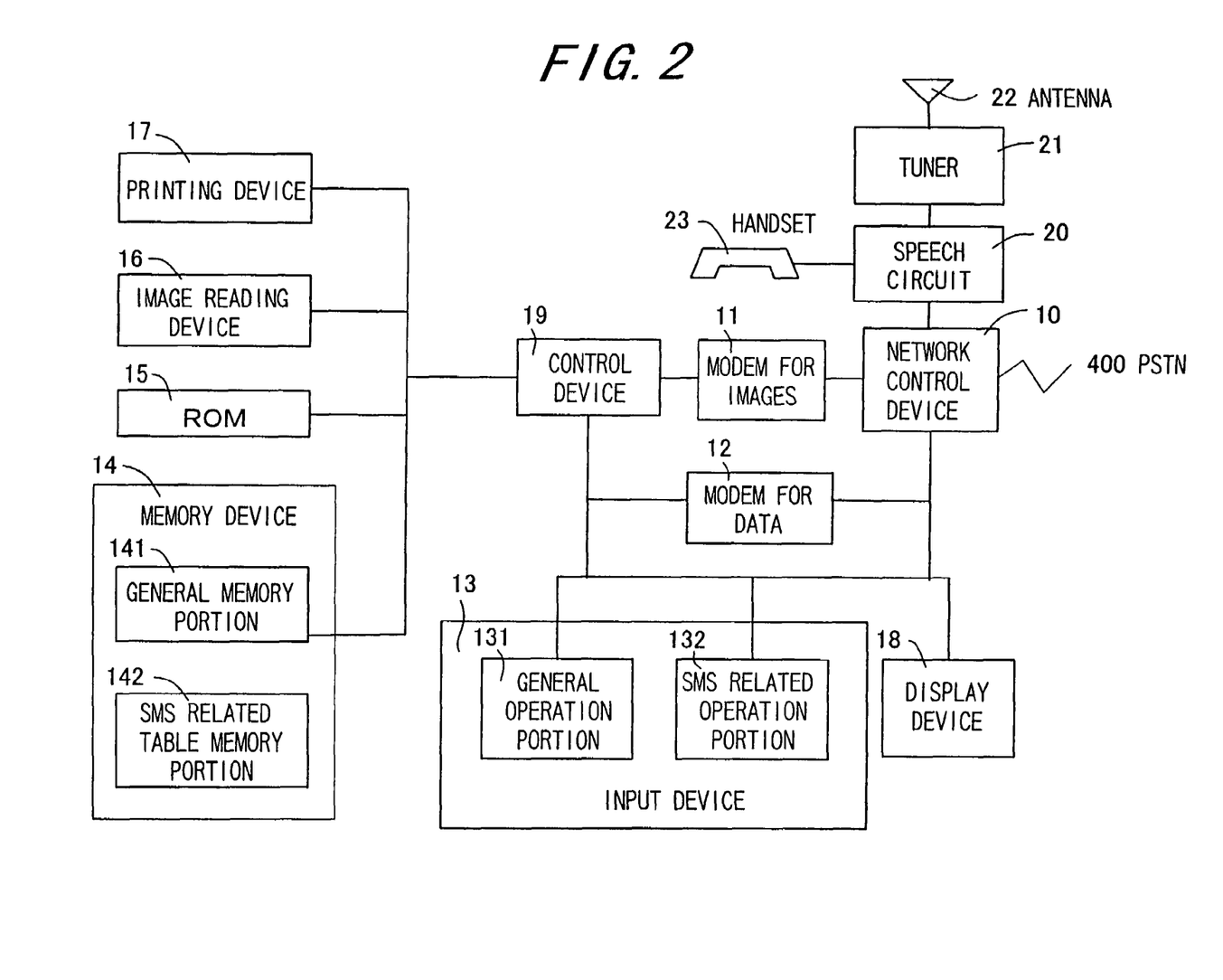
FIG. 2 is a block diagram showing the configuration of a master unit of a short message service compatible communication terminal (SMTE), which is an embodiment of the invention.

FIG. 2 is a block diagram showing the configuration of the master unit 1a of the short message service compatible communication terminal (SMTE) 1, which is an embodiment of the invention. The SMTE 1 is a facsimile apparatus, and the master unit 1a includes a network control device 10, a modem for images 11, a modem for data 12, an input device 13, a memory device 14, a ROM (read-only memory) 15, an image reading device 16, a printing device 17, a display device 18, a control device 19, a speech circuit 20, a tuner 21, an antenna 22 and a handset 23.

The network control device 10 is connected to the PSTN 400, has the electrical characteristics required by the PSTN 400, monitors the status of the line, receives signals from the PSTN 400 and sends signals to the PSTN 400. The modem for images 11 modulates digital signals for images to be sent into analog signals suitable for the PSTN 400, and demodulates the analog signal (facsimile signals) for images received by the network control device 10. The modem for data 12 demodulates data signals received by the network control device 10 in order to identify the short message and the sender ID (CID) and modulates character data to be sent. The network control device 10 and the modem for data 12 constitute communication means.

The image reading device 16 is a device for reading an original text to be sent by a facsimile or copied, and employs a reading method such as a reading method with an optical system that has been reduced in size by combining a lens and a CCD line sensor or a method with a contact sensor using a rod lens array. The printing device 17 is printing means for printing image data and short message data (character data) received by the network control device 10 and image data that is read out by the image reading device 16, and uses a printing system such as a thermal system, an electrophotographic system, an inkjet system or the like.

The speech circuit 20 converts communication signals received by the network control device 10 into audio signals and outputs the audio signals to the handset 23 or the tuner 21, and converts audio signals inputted from the handset 23 or the tuner 21 into communication signals. The tuner 21 amplifies the audio signals output from the speech circuit 20 and sends radio waves at a predetermined frequency from the antenna 22. The tuner 21 and the antenna 22 constitute the master unit side wireless communication means. The handset 23 includes a speaker and a microphone. The microphone converts a speech of a user into audio signals and the speaker converts the audio signals output from the speech circuit 20 into a speech and outputs the speech.

The memory device 14 is storing means including a general memory portion 141 and an SMS related table memory portion 142. The general memory portion 141 is used as a working memory, a buffering or the like for storing received or read images and the status of the SMTE 1 related to transmission of facsimile data, or temporarily storing various data during operation. The SMS related table memory portion 142 stores the state of the master unit 1a related to transmission of short messages or data specific to the short message service, for example, short message data that is received. The data to be stored in the SMS related table memory portion 142 will be described later.

The input device 13 is master unit side input means including a general operation portion 131 and an SMS related operation portion 132. The general operation portion 131 includes dial keys used to input a telephone number for facsimile transmission or telephone calling and is used for other operations. The SMS related operation portion 132 is used to select the SMSC apparatus to which a short message is to be sent and perform other operations related to transmission of short messages. Examples of the key structure of each operation portion will be described later.

The display device 18 is master unit side displaying means that can be realized by a liquid crystal display or the like, and displays the operation state of the SMTE 1 during facsimile transmission, telephone calling or short message transmission, or displays image data or short message data. The input device 13 and the display device 18 constitute the master unit side inputting means, instructing means and designating means.

The control device 19 determines the operation of the entire SMTE 1 based on the inputted information from the input device 13, the information received from the PSTN 400 or the like in cooperation with the memory device 14 and the ROM 15 in which a control program for operating the SMTE 1 is stored, and supplies instructions to the entire SMTE 1. The control device 19 constitutes selecting means, counting means, converting means and controlling means.

Figure 3:
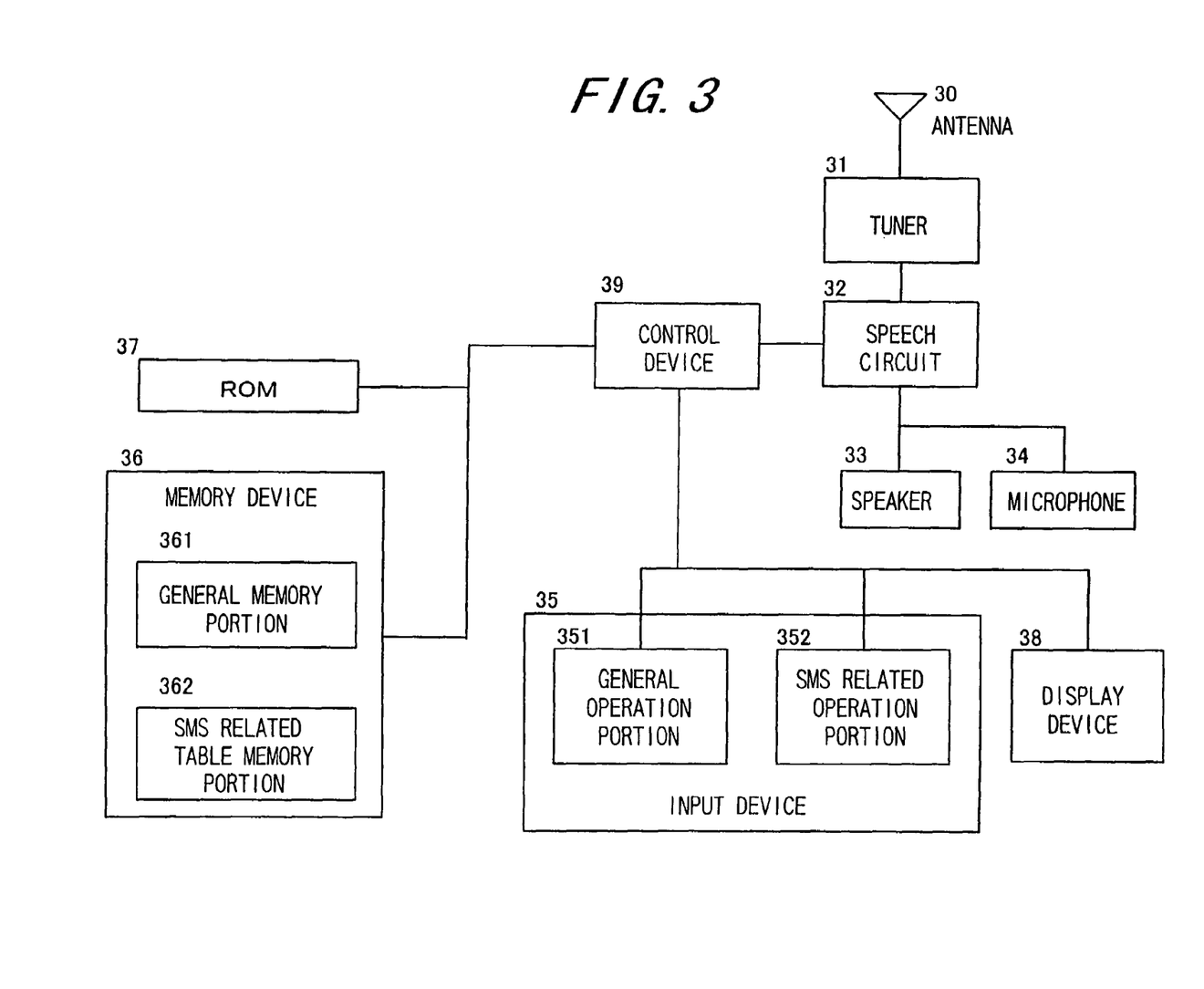
FIG. 3 is a block diagram showing the configuration of a slave unit of the SMTE.

FIG. 3 is a block diagram showing the configuration of the slave unit 1b. The configuration of the slave unit 1c is the same as that of the slave unit 1b, and therefore the configuration of the slave unit 1b will be described. The slave unit 1b includes an antenna 30, a tuner 31, a speech circuit 32, a speaker 33, a microphone 34, an input device 35, a memory device 36, a ROM 37, a display device 38 and a control device 39.

The tuner 31 attenuates radio waves received by the antenna 30 and outputs the ratio wave to the speech circuit 32. The tuner 31 and the antenna 30 constitute the slave unit side wireless communication means. The speech circuit 32 converts communication signals output from the tuner 31 into audio signals and outputs the audio signals to the speaker 33, and converts audio signals output from the microphone 34 into communication signals. The speaker 33 converts the audio signals output from the speech circuit 32 into a speech and outputs the speech. The microphone 34 converts a speech of a user into audio signals and outputs the audio signals to the speech circuit 32.

The memory device 36 is storing means including a general memory portion 361 and an SMS related table memory portion 362. The general memory portion 361 is used as a working memory, a buffering or the like for storing images received or read by the master unit 1a and the status of the slave unit 1b related to transmission of short message data, or temporarily storing various data during operation. The SMS related table memory portion 362 stores short messages received from the master unit 1a.

The input device 35 is slave unit side input means including a general operation portion 351 and an SMS related operation portion 352. The general operation portion 351 includes dial keys used to input a telephone number for telephone calling and is used for other operations. The SMS related operation portion 352 is used to perform operations related to transmission of short message data. Examples of the key structure of each operation portion will be described later.

The display device 38 is the slave unit side displaying means and output means that can be realized by a liquid crystal display with higher definition than that of the master unit 1a or the like, and displays the operation state of the slave unit 1b during telephone calling or short message transmission, or displays image data and short message data. The short message data can be output, not only by display on the display device 38, but also by audio output from the speaker 33.

The control device 39 determines the operation of the entire slave unit 1b based on the input information from the input device 35, the information received from the master unit 1a or the like in cooperation with the memory device 36 and the ROM 37 in which a control program for operating the slave unit 1b is stored, and supplies instructions to the entire slave unit.

Figure 4:
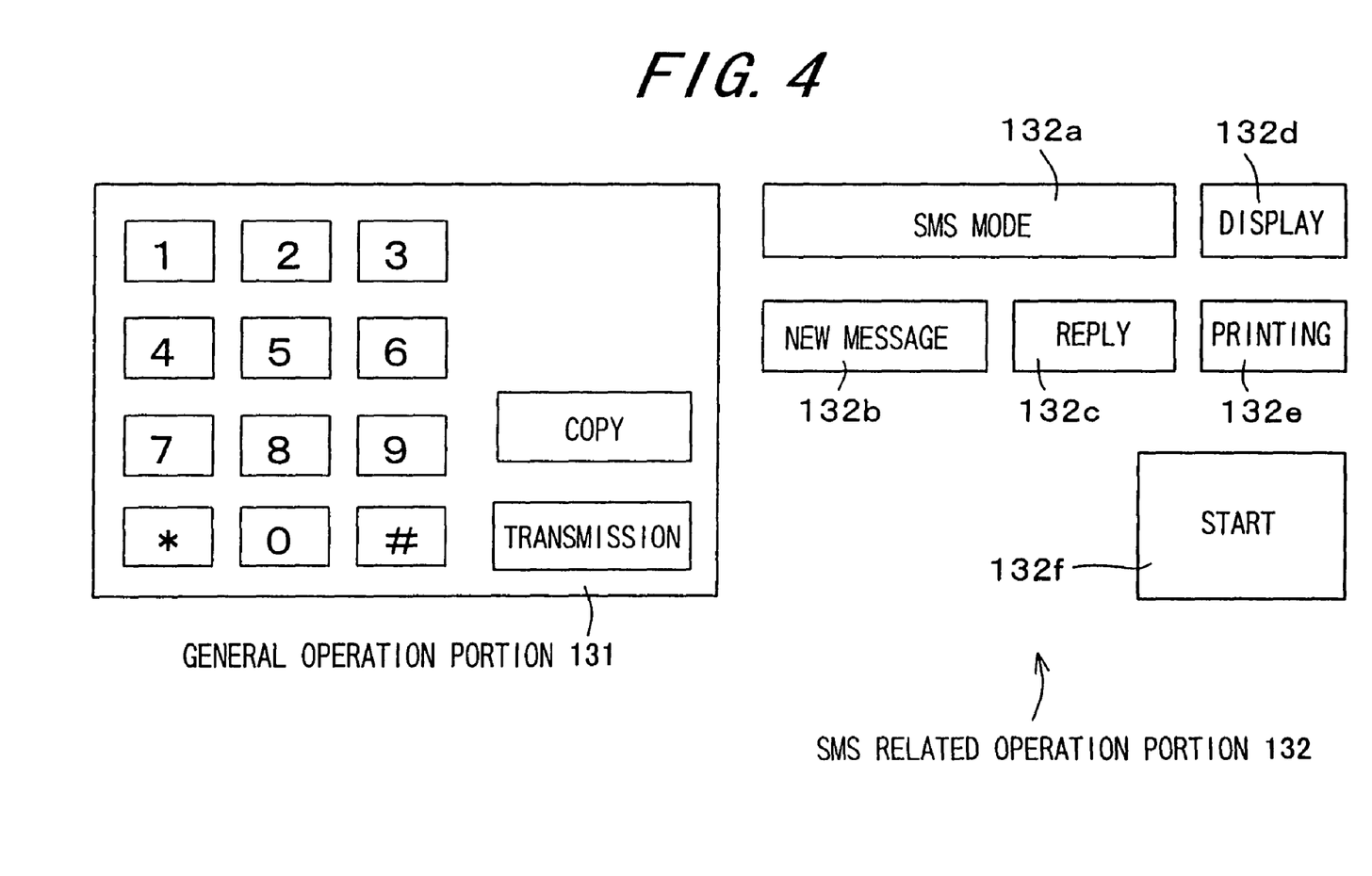
FIG. 4 is a diagram showing an example of a key configuration of an input device of the master unit.

FIG. 4 is a diagram showing an example of the key structure of the input device 13 of the master unit 1a. The general operation portion 131 includes number keys, operation keys for facsimile, and operation keys for telephone. The SMS related operation portion 132 includes an SMS mode key 132a, a new message key 132b, a reply key 132c, a display key 132d, a printing key 132e, and a start key 132f.

The SMS mode key 132a is a key to be entered when switching the operation mode of the master unit 1a from the facsimile mode to the SMS mode. When a user enters the SMS mode key 132a, the control device 19 operates the display device 18 so as to display that the key is entered, and performs preparation for an operation such as initialization of the modem for data 12.

When the new message key 132b is entered in the SMS mode, a new short message can be sent. After the new message key 132b is entered, short message data or the like is inputted.

When the reply key 132c is entered in the SMS mode, a short message that is prepared can be sent as a reply to the SMTE that sent a received short message. For example, the display key 132d is entered to display a received short message on the display device 18, and in this state, the reply key 132c is entered. Then, when a short message to be sent is inputted with the input device 13, the prepared short message can be sent as a reply to the SMTE that sent the displayed short message.

When the printing key 132e is entered in the SMS mode, received short message data can be printed with the printing device 17. For example, the display key 132d is entered to display a received short message on the display device 18, and in this state, when the printing key 132e is entered, the displayed short message can be printed.

The start key 132f is entered to send, display and print short messages as described above, and thus the operation can be confirmed.

Figure 5:
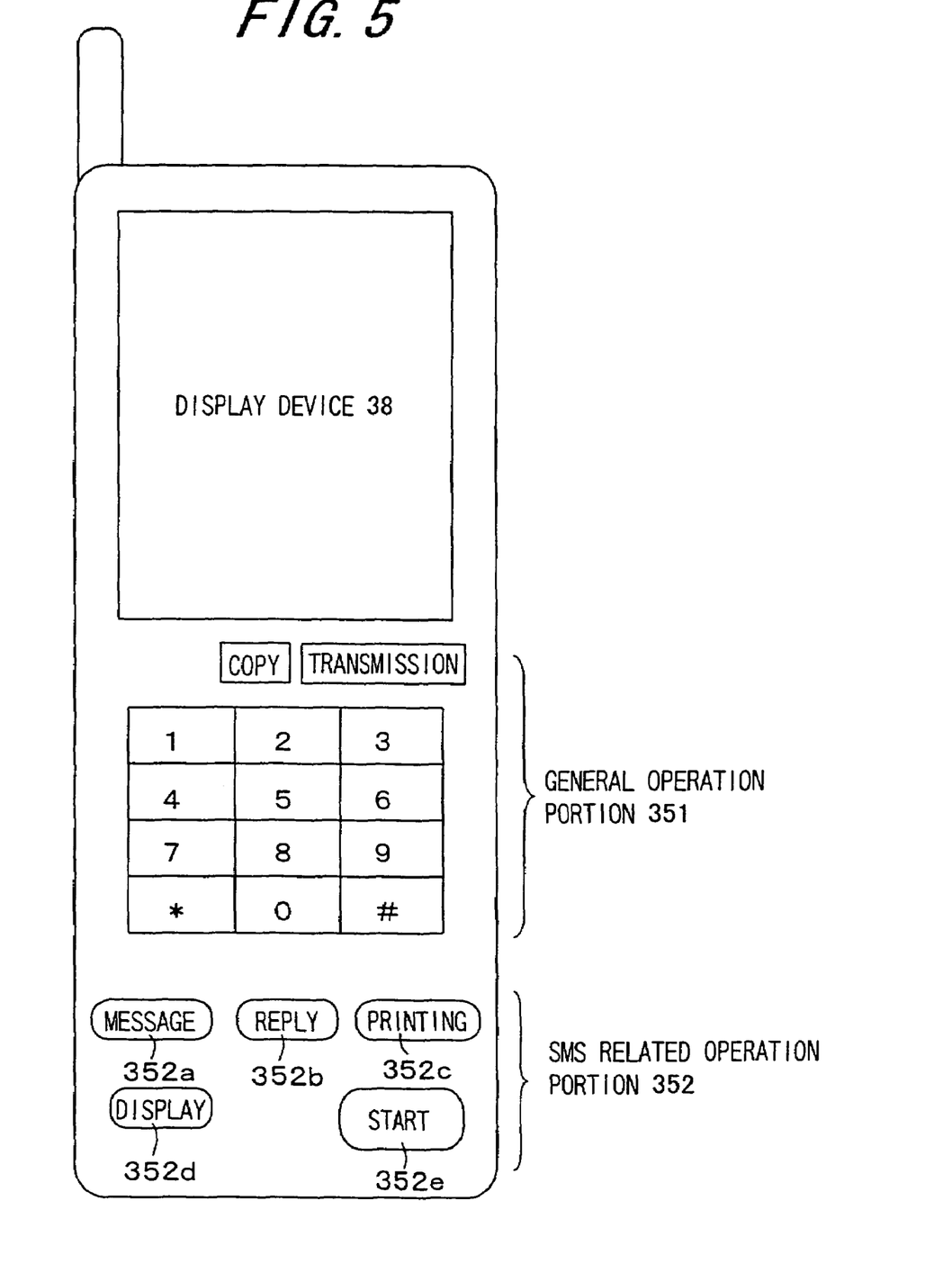
FIG. 5 is a diagram showing an example of a key configuration of an input device of the slave unit.

FIG. 5 is a diagram showing an example of the key structure of the input device 35 of the slave unit 1b. The general operation portion 351 includes number keys, operation keys for facsimile, and operation keys for telephone. The SMS related operation portion 352 includes a message key 352a, a reply key 352b, a printing key 352c, a display key 352d, and a start key 352e.

When the message key 352a is entered, the control device 39 establishes a wireless channel with the master unit 1a, and sends a request signal that requests the master unit 1a to be turned into the SMS mode to the master unit 1a. After the master unit 1a is turned into the SMS mode, short message data is inputted from the input device 35, and the short message data can be sent.

When the reply key 352b is entered, the master unit 1a is turned into the SMS mode in the same manner as the message key 352a is entered. After the master unit 1a is turned into the SMS mode, a prepared short message can be sent as a reply to the SMTE that sent a received short message. For example, the display key 352d is entered so that an already received short message is acquired from the master unit 1*a* and the received short message is displayed on the display device 38. While keeping this state, the reply key 352*d* is entered, and then a short message to be sent is inputted with the input device 35. Then, the prepared short message can be sent as a reply to the SMTE that sent the displayed short message.

When the printing key 352*c* is entered in the SMS mode, already received short message data can be printed with the printing device 17 of the master unit 1*a*. For example, the display key 352*d* is entered so that an already received short message is acquired from the master unit 1*a* and the received short message is displayed on the display device 38. While keeping this state, the printing key 352*c* is entered, and then the displayed short message can be printed.

The display key 352*d* not only can acquire an already received short message from the master unit 1*a* and display the message on the display device 38, but also can display facsimile image data that is stored in the master unit 1*a* and image data read by the image reading device 16 or the like on the display device 38. The display function of the display device 18 of the master unit 1*a* is rather limited, and one character is displayed in, for example, 7 dots×5 dots, so that it is difficult to display character sets for GSM of the European standard including accent marks of German or French and special characters. On the other hand, the display device 38 of the slave unit 1*b* has such a high definition display function as based on VGA, so that image data can be displayed better on the display device 38 of the slave unit 1*b*. When the display key 352*d* is entered, the master unit 1*a* converts the character code into image data using the character generator (CG) function based on the character set for GSM with the control device 19, and sends the converted image data to the slave unit 1*b*. The slave unit 1*b* displays the received image data on the display device 38. The user can select which of the already received short message and the image data is displayed after the display key 352*d* is entered.

The start key 352*e* is entered to send, display and print short messages as described above, and thus the operation can be determined.

Figure 6:
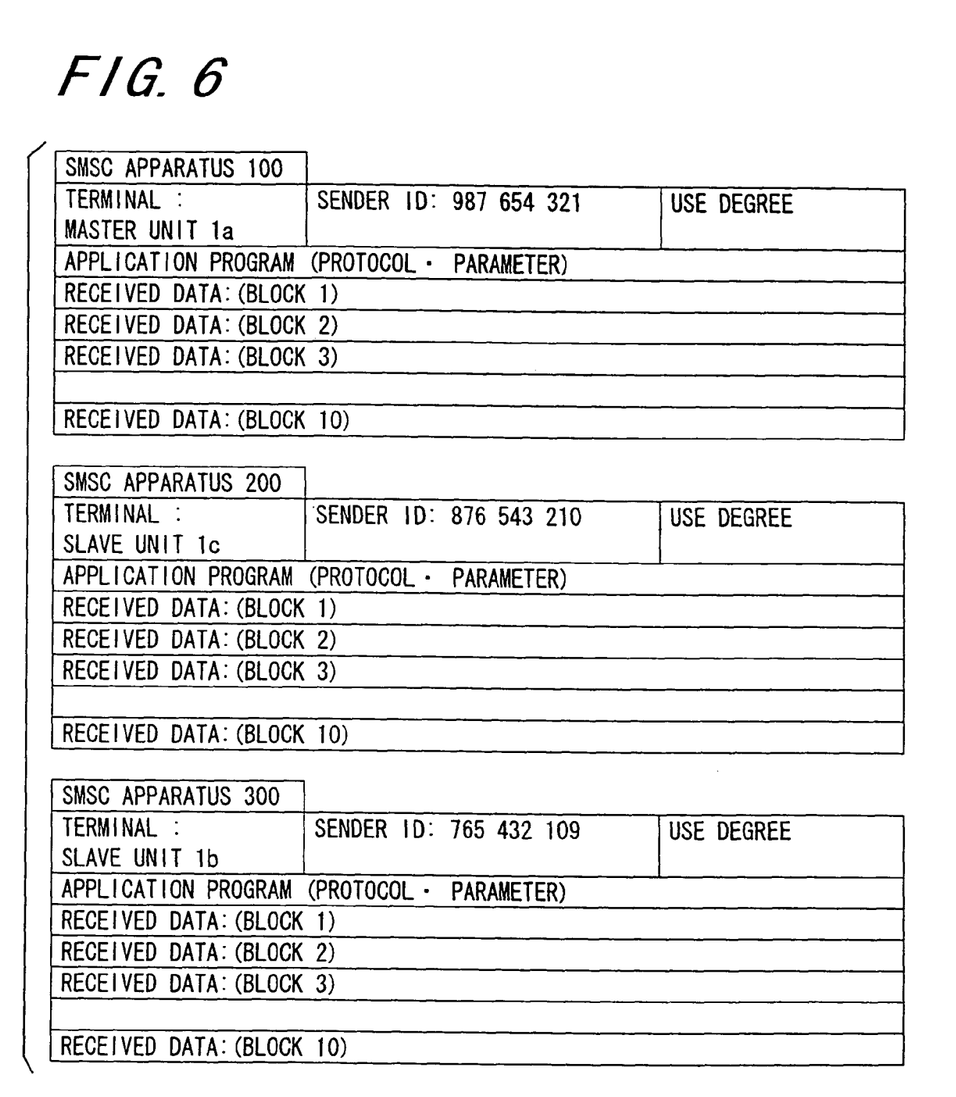
FIG. 6 is a diagram showing a storing region of an SMS related table memory portion.

FIG. 6 is a diagram showing a storing region of the SMS related table memory portion 142. As shown in FIG. 6, the SMS related table memory portion 142 has a plurality of storing regions. These storing regions are constituted by storing regions 101, 201 and 301 for the SMSC apparatuses 100, 200 and 300, respectively, which are individual regions. Even in the case where more SMSC apparatuses are registered, the allocation is performed in the same manner.

In the storing region 101 for the SMSC apparatus 100, the name of the SMSC apparatus, the type of the terminal, the sender ID (telephone number) of the SMSC apparatus, the degree of use, the application program, and received data is stored.

The name inputted by the user to identify the SMSC apparatus when registering an SMSC apparatus to which a short message is to be sent is stored as the name of the SMSC apparatus. In FIG. 6, "SMSC apparatus 100" is stored. "Type of terminal" indicates the type of the terminal that performs communications with the SMSC apparatus 100, and either one of "master unit 1*a*", "slave unit 1*b*" and "slave unit 1*c*" is stored.

As the sender ID (telephone number), identification information to identify the SMSC apparatus of the sender, that is, the number unique to the SMSC apparatus, and in general, the telephone number assigned to the SMSC apparatus is stored. In FIG. 6, the telephone number "987 654 321" of the SMSC apparatus 100 is stored.

When sending short message data, the control device 19 determines which one of the master unit 1*a* and the slave units 1*b* and 1*c*, more specifically, whether or not the SMS related operation portion 132 of the master unit 1*a* is operated, and whether or not the SMS related operation portion 352 of the slave unit 1*b* or 1*c* is operated, and refers to the storing region for the SMSC apparatus corresponding to the terminal whose SMS related table memory portion 142 is operated. Then, a short message is sent with the communication protocol and the parameter that are stored therein.

When receiving short message data, the control device 19 determines from which SMSC apparatus a short message is received, more specifically, which SMSC apparatus has the telephone number corresponding to the telephone number contained in the incoming call signal. Based on the determination results, the storing region for the SMSC apparatus is referred to, and then the short message is received with the communication protocol and the parameter that are stored therein. After the short message has been received, the corresponding terminal is notified that a short message is received. In the case where the corresponding terminal is the slave unit 1*b* or 1*c*, the short message data is received and stored and then a wireless channel is established to send notification message data. At this point, the received short message data can be sent at the same time.

The degree of use is the amount of use of the short message service, that is, the degree of communications with the SMSC apparatuses. The degree of communications is varied with the providers of the short message service, such as based on the communication time during which the SMSC apparatuses communicate with the SMTEs, the data capacity transmitted between the SMSC apparatuses and the SMTEs, or the number of times of short message data transmission regardless of the time or the capacity. When data for each SMSC apparatus are inputted, the manner in which the degree of communications is measured can be set as the degree of use. The control device 19 counts up the degree of use of the SMSC apparatus that performed communications at the time of short message data transmission.

In the case where a plurality of terminals are used as in this embodiment, each terminal tends to be used by a different user, so that the manager of the communication fees can charge the user of each terminal based on the stored degree of use.

The application program (protocol parameter) that is communication protocol information is a communication program and a communication parameter for communications with the communication protocol required for mutual communications with the SMSC apparatus. A part of or the entire application program can be acquired by downloading from the SMSC apparatus.

The received data is short message data received from the SMSC apparatus and is defined based on the maximum number of characters of the short message. In this embodiment, for example, it is 160 bytes and the data is stored in blocks segmented every 160 bytes.

The name of the SMSC apparatus, the type of the terminal and the sender ID (telephone number) are inputted by the user with the input device 13 and are stored.

Figure 7A:
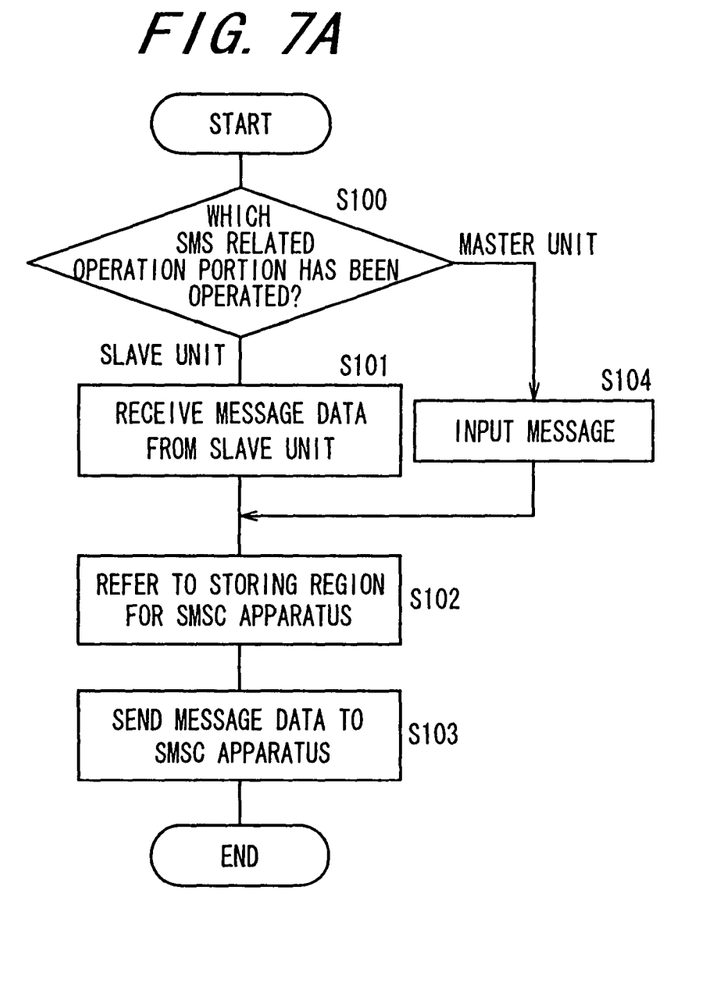
FIGS. 7A and 7B are flow charts showing the short message data sending process of SMTE.
Figure 7B:
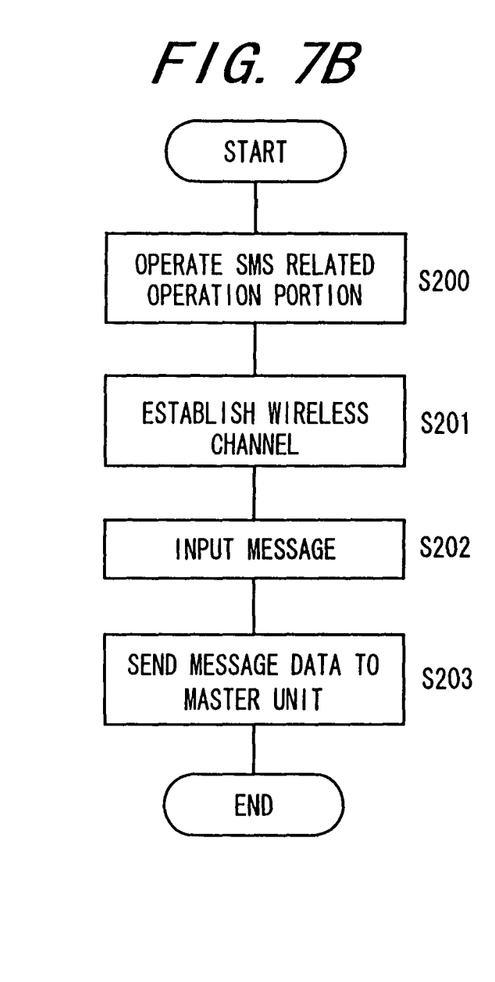

FIGS. 7A and 7B are flow charts showing the short message sending process of the SMTE 1. FIG. 7A shows the process of the master unit 1*a*, and FIG. 7B shows the process of the slave unit 1*b* (1*c*). Referred to FIG. 7A, the control device 19 of the master unit 1*a* monitors the operation of the SMS related operation portion 132 of the master unit 1*a* of the SMS related operation portion 352 of the slave unit 1*b*.

In a step S100, it is determined which SMS related operation portion is operated. When the SMS related operation portion 132 of the master unit 1a is operated, the procedure goes to a step S104, and when the SMS related operation portion 352 of the slave unit 1b is operated, the procedure goes to a step S101. When sending a short message from the master unit 1a, in the step S104, the user inputs a short message to be sent with the input device 13 and the like. In a step S102, the storing region for the SMSC apparatus 100 in which "master unit 1a" is stored as the type of the terminal is referred to, and dial calling is performed to the stored telephone number "987 654 321". In a step S103, the short message is sent to the SMSC apparatus 100 with the communication protocol and the communication parameter that are based on the stored application program, and thus the process ends.

Regarding the process of the slave unit 1b, referred to FIG. 7B, when the message key 352a or the like is entered in a step S200, the SMS related operation portion 352 is operated, and in a step S201, the control device 39 establishes a wireless channel with the master unit 1a, and requests the master unit 1a to be turned into the SMS mode. In the step S100 of the master unit 1a, shown in FIG. 7A, upon reception of this request, the control device 19 detects that the SMS related operation portion 352 of the slave unit 1b is operated. In a step S202, the user inputs a short message to be sent with the input device 35 and the like. In a step S203, the short message that is inputted to the master unit 1a is sent via the established wireless channel.

Referred to FIG. 7A again, the master unit 1a receives the short message from the slave unit 1b in a step S101. In a step S102, if it is assumed that the slave unit from which the short message is sent is the slave unit 1b, the storing region for SMSC apparatus 300 in which "slave unit 1b" is stored as the terminal is referred to, and dial calling is performed to the stored telephone number "765 432 109". In a step S103, the short message is sent to the SMSC apparatus 300 with the communication protocol and the communication parameter that are based on the stored application program, and thus the process ends.

Thus, when either one of the master unit 1a and the slave units 1b and 1c is operated by a user, the SMSC apparatus corresponding to the operated terminal is selected, and the short message is sent with an appropriate protocol, short messages can be sent from a plurality of terminals. A plurality of users can send short messages by operating respective terminals.

Figure 8A:
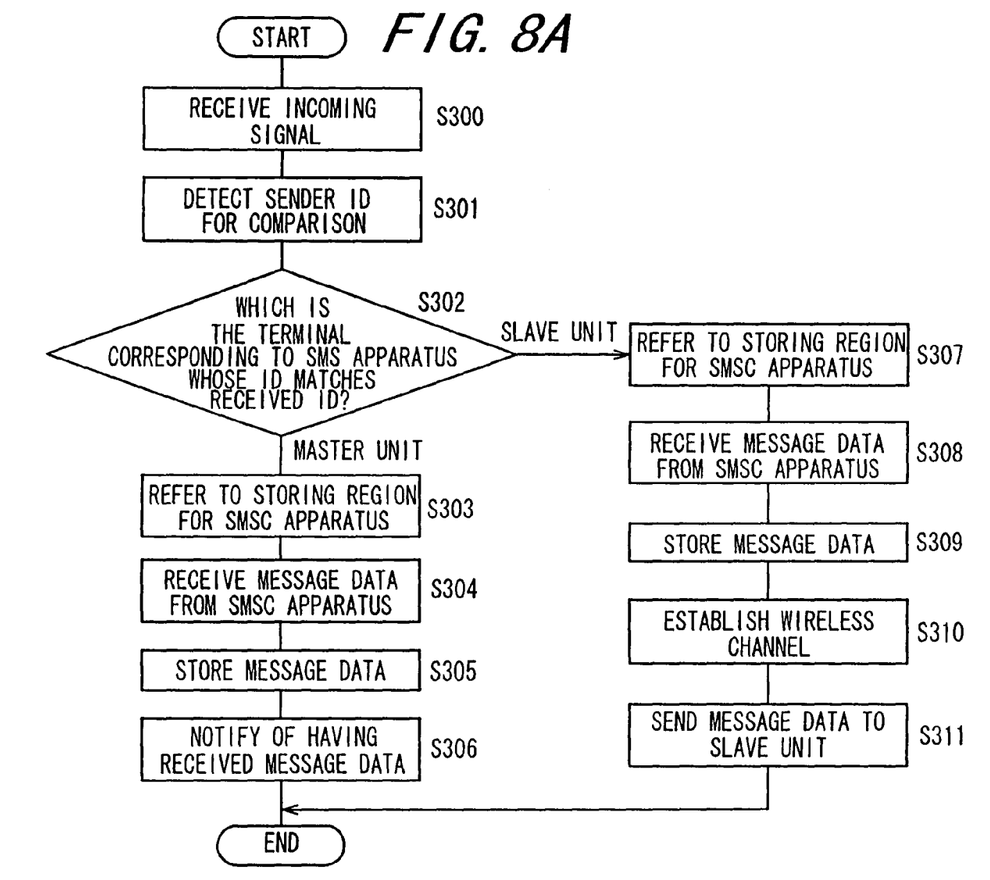
FIGS. 8A and 8B are flow charts showing the short message data receiving process of SMTE.
Figure 8B:
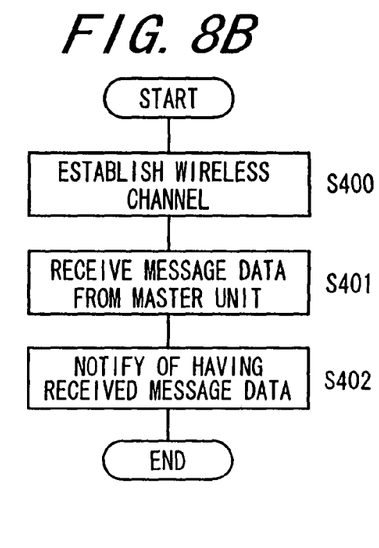

FIGS. 8A and 8B are flow charts showing the short message receiving process of the SMTE 1. FIG. 8A shows the process of the master unit 1a, and FIG. 8B shows the process of the slave unit 1b (1c). Referred to FIG. 8A, in a step S300, when an incoming calling signal (ringer) has arrived from the switchboard of the PSTN 400, the network control device 10 detects the incoming calling signal. In a step S301, the telephone number contained in the received incoming calling signal is compared with the telephone number stored in the storing regions for all the SMSC apparatuses in order to determine whether or not the received incoming calling signal is an incoming calling signal from a registered SMSC apparatus. In a step S302, from the comparison results, it is determined which terminal corresponds to the SMSC apparatus whose telephone number matches the received telephone number. When the terminal is the master unit 1a, the procedure goes to a step S303, and when the terminal is the slave unit 1b or 1c, the procedure goes to a step S307.

In the step S303, the storing region for the SMSC apparatus 100 in which "master unit 1a" is stored as the type of the terminal is referred to, and in a step S304, a short message is received from the SMSC apparatus 100 with the communication protocol and the communication parameter that are based on the stored application program. In a step S305, the received short message is stored in the storing region for the SMSC apparatus 100, and in a step S306, the fact that a short message is received is displayed on the display device 18 or the like, and thus the process ends.

In a step S302, for example, when the received telephone number matches the telephone number of the SMSC apparatus 200 corresponding to the slave unit 1c, the procedure goes to a step S307. In the step S307, the storing region for the SMSC apparatus 200 in which "slave unit 1c" is stored as the type of the terminal is referred to, and in a step S308, a short message is received from the SMSC apparatus 200 with the communication protocol and the communication parameter that are based on the stored application program. In a step S309, the received short message is stored in the storing region for the SMSC apparatus 200. In a step S310, a wireless channel is established between the master unit 1a and the slave unit 1c, and the slave unit 1c is notified that a short message is received. In a step S311, the received short message is sent to the slave unit 1c via the established wireless channel, and the process ends.

In the slave unit 1c, referred to FIG. 8B, corresponding to the step S310 of the master unit 1a, in a step S400, a wireless channel is established, and the slave unit 1c is notified that the master unit 1a has received a short message addressed to the slave unit 1c. In a step S401, the short message sent in the step S311 of the master unit 1a is received via the established wireless channel, and is stored in the SMS related memory portion 362. In a step S402, the fact that a short message is received is displayed on the display device 38 or the like, and thus the process ends.

Thus, the master unit receives a short message from an SMSC apparatus with an appropriate communication protocol, and when the terminal corresponding to the SMSC apparatus from which the short message is sent is a slave unit, the received short message is sent to the slave unit. Thus, short messages can be received by a plurality of terminals. A plurality of users can receive short messages by operating respective terminals.

In this embodiment, the name of the SMSC apparatus, the type of the terminal, the sender ID (telephone number) of the SMSC apparatus, the degree of use, the application program and the SMS related data such as received data is stored in the SMS related table memory portion 142 of the master unit 1a, and referred to when a short message data is sent and received. However, these data can be stored in the SMS related memory portion 362 of the slave unit 1b or 1c, and short message data can be sent and received in the following manner, for example. When sending a short message data from the slave unit 1b or 1c to the master unit 1a, the slave unit can select the SMSC apparatus to which short message data is to be sent, and the protocol information of the selected SMSC apparatus can be sent together with the short message data. Furthermore, if short message data can be inputted from the input device 35 of the slave unit 1b or 1c, and short message data can be output and displayed on the display device 38 of the slave unit 1b or 1c, then the short message data can be sent and received by the user operating the slave unit that is connected wirelessly to the master unit. Thus, the short message data can be sent and received at an arbitrarily selected place in the communication zone between the master unit and the slave unit, which improves the convenience. Therefore, it is not necessary that input should be performed from the input device 13 of the master unit 1a and that display and output should be performed on the display device 18. Furthermore, a plurality of SMSC apparatuses are not necessarily used for communications, and only one SMSC apparatus may be used. In addition, a plurality of slave units are not necessarily used for communications, and only one slave unit may be used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication terminal that is connected to a public line network, to communicate with a center apparatus connected to the public line network to send and receive short message data to/from another connnunieation terminal via the center apparatus,
   the communication terminal conmrising:
   a master unit; and
   a slave unit operatively connected to said master unit performing mutual wireless communications with the master unit,
   the slave unit including:
      a slave input device inputting short message data, wherein
      the slave unit sending the short message data inputted with the slave input device and receiving short message data from the master unit over wireless communications,
   the master unit including:
      a master input device inputting short message data, and
      a master communicating device that is connected to a public line network, sending and receiving short message data to/from the center apparatus, wherein
      the master communicating device unit sending short message data received by the master communicating device to the slave unit and receiving short message data from the slave unit,
      a storing device storing a plurality types of communication protocol information, each of which corresponds to a center apparatus, to be used to communicate with the master communication device,
      a selecting device selecting a center apparatus to be communicated with among the center apparatuses whose communication protocol information is stored, based on a predetermined condition, and
      a controlling device controlling the master communicating device so as to send short message data inputted with the master unit input device or short message data received by the master communicating device to the center apparatus when sending the short message data, and to receive short message data from the center apparatus when receiving the short message data, based on the communication protocol information of the center apparatus selected by the selecting device, and determining whether or not the short message data received from the center apparatus is addressed to the slave unit, and when the short message data is determined as being addressed to the slave unit, controlling the master communicating device so as to send the received short message data to the slave unit.

2. The communication terminal of claim 1, wherein the storing device stores association between each center apparatus whose communication protocol information is stored and the master unit or the slave unit, and
   when the master communicating device has received short message data inputted with the slave input device, the selecting device selects a center apparatus associated with the slave unit from which the short message data is sent; and when the short message data is inputted with the master input device, the selecting device selects a center apparatus associated with the master unit.

3. The communication terminal of claim 2, wherein, when the master communicating device receives short message data from a center apparatus, the controlling device refers to the storing device and determines whether or not the center apparatus that sent the short message data is a center apparatus associated with the slave unit, so as to determine whether or not the received short message data is addressed to the slave unit.

4. The communication terminal of claim 1, wherein the master unit includes counting device counting the degree of communications indicating the communication amount with a center apparatus for each center apparatus whose communication protocol information is stored, and storing the counted communication amount in the storing device for each center apparattus.

5. The communication terminal of claim 1, wherein the master unit includes printing device printing short message data, and
   at least one of the master unit and the slave unit includes designating device designating short message data to be printed by the printing device from among received short message data addressed to the slave unit.

6. The communication terminal of claim 1, wherein the master unit includes master unit side displaying device displaying short message data,
   the slave unit includes slave unit side displaying device displaying short message data, and
   the slave unit side displaying device has higher resolution than that of the master unit side displaying device.

7. The communication terminal of claim 6, wherein the master unit includes converting device converting a character code into a character font,
   the master commnnicating device sends a character font converted from a character code contained in received short message data to the slave unit as image data; the slave unit receives the image data sent from the master unit; and the slave unit side displaying device displays the image data received by the slave unit in place of the short message data.

8. A communication terminal that is connected to a public line network, to send and receive short message data to/from a center apparatus connected to the public line network to send and receive the short message data to/from another communication terminal via the center apparatus,
   the communication terminal comprising:
   a master unit; and
   a slave unit operatively connected to said master unit performing mutual wireless communications with the master unit,
   the slave unit including:
      an input device inputting short message data to be sent to the center apparatus, and an output device outputting short message data received from the center apparatus, a slave communicating device sending the short message data inputted with the input device and rceiving short message data from the master unit, and a selecting device selecting a center apparatus to be communicated with, the master unit including:

a master communicating device that is connected to a public line network, sending and receiving short message data to/from the center apparatus, wherein the master communicating device sending short message data received to the slave unit and receiving short message data front the slave unit, a storing device storing a plurality types of communication protocol information, each of which corresponds to a center apparatus, and a controlling device controlling the master communicating device so as to send short message data received by the master communicating device to the center apparatus when sending the short message data, and to receive short message data from the center apparatus when receiving the short message data, based on the communication protocol information of the center apparatus selected by the selecting device, and determining whether or not the short message data received from the center apparatus is addressed to the slave unit, and when the short message data is determined as being addressed to the slave unit, controlling the master communicating device so as to send the received short message data to the slave unit.

* * * * *